Patented July 13, 1926.

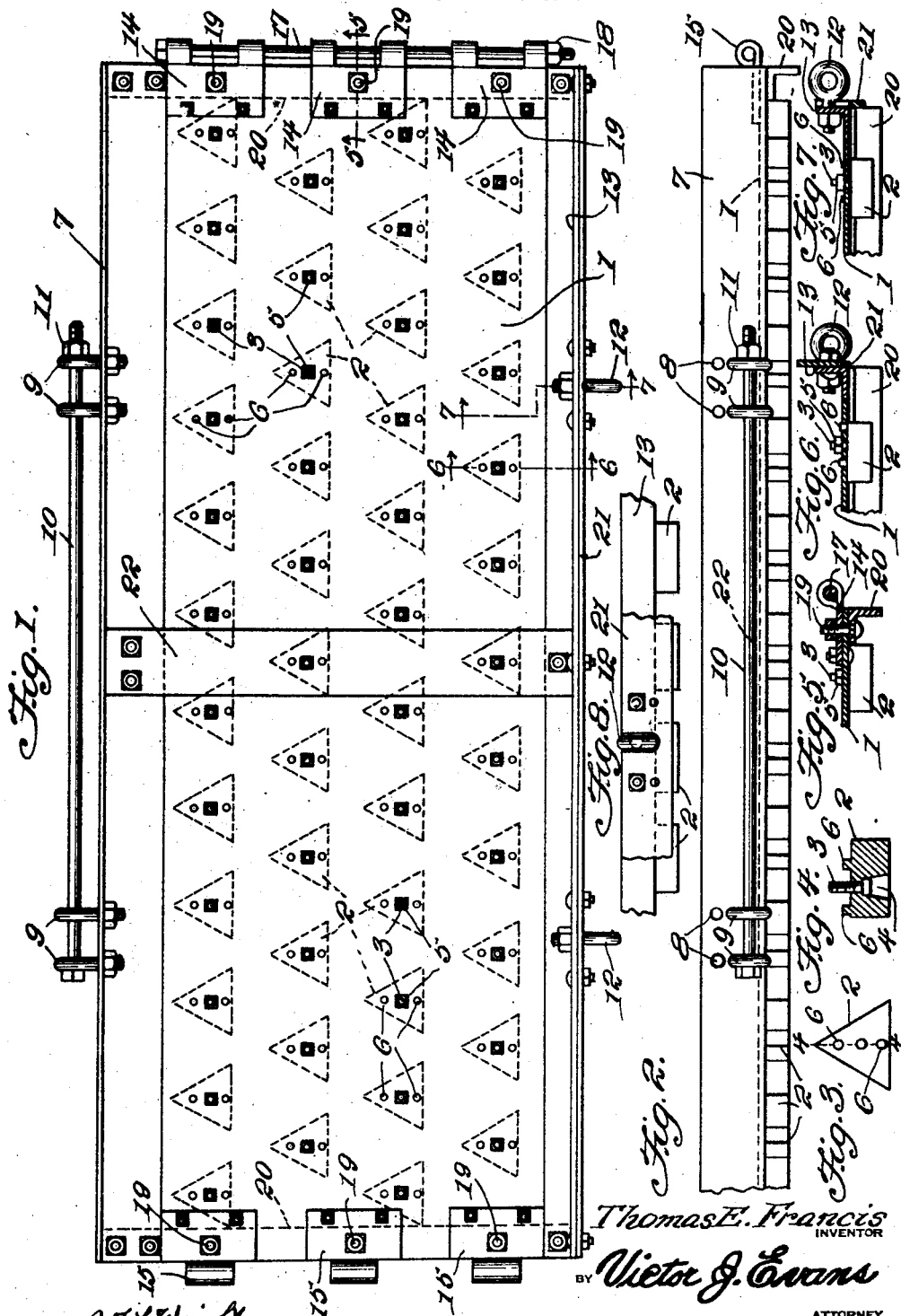

1,592,731

UNITED STATES PATENT OFFICE.

THOMAS ERNEST FRANCIS, OF BURKEVILLE, VIRGINIA.

SURFACE PULVERIZER.

Application filed April 18, 1925. Serial No. 24,186.

This invention relates to improvements in agricultural implements and more particularly to the soil pulverizing type.

The primary object of the invention is to provide a surface pulverizer that adequately pulverizes soil and breaks up or disintegrates large, dry, hard, multitudinous clods and effectually creates a proper state of tilth for the retention of the soil moisture necessary for the proper growth of seed.

A further object is to provide a simple and effectuous pulverizer of this class that can be dragged over the soil for the intended purpose in the form of a plurality of connected sections, each section being provided with means for connecting companion sections thereto.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a top plan view of one section of the device forming the subject matter of the present invention.

Figure 2 is a front view thereof.

Figure 3 is a detail view of one of the pulverizing units.

Figure 4 is a sectional view taken on line 4—4 of Figure 3.

Figure 5 is a sectional view taken on line 5—5 of Figure 1.

Figure 6 is a sectional view taken on line 6—6 of Figure 1.

Figure 7 is a sectional view taken through a fragmentary portion of a section and showing the leveling strip in lowered position.

Figure 8 is a fragmentary rear elevation of the section as shown in Figure 7.

While the details of one section is shown in the drawings, it should be understood that the pulverizer is preferably formed from a plurality of sections, all of like construction. Of course only one section could be used if only a small plot of land is to be conditioned.

Referring to the drawings in detail each section is constructed from an elongated plate 1 having secured in a manner to depend from the lower surface thereof a plurality of substantially V-shaped units 2 which are arranged in row formation as shown in Figure 1 of the drawings and in a manner whereby one row of units is disposed with the apex of each unit arranged directly in the rear of the space between the units of the row ahead, so that clods of dirt and the like in coming in contact with the pointed apex of the first row will be cut or otherwise broken up and the parts of the clod being broken up and deflected so as to be engaged by the apex of the adjacent rear row.

The plate 1 is provided with a plurality of openings through which pass bolts 3 for securing the units thereto, each unit being formed with a bore 4 in its lower surface whereby the head of the bolts are countersunk as clearly shown in Figure 4 of the drawings, nuts 5 are associated with the bolts as shown in Figure 1. The units are also provided with upstanding studs 6 which are received in recesses formed upon each side of the bolt openings, and by this construction it will be apparent that the units are prevented from rotating on the bolts with the result that the apex end of the respective units will always be positioned as shown. Arranged parallel with and engaging the longitudinal front edge of the plate 1 is a cross sectional angle shape strip 7 which has formed therein openings 8 arranged in pairs as clearly shown in Figure 2 of the drawings. The openings 8 are adapted to receive eye bolts 9 which may be secured in parallelism in either the upper or lower pair of openings if desired, therefore it will be seen that the eye bolts are adjustably associated with the strip. A headed rod 10 having one end threaded is received through the eye bolts as shown in Figure 1 and a nut 11 secures said rod in operative position, the rod being adapted to receive eye bolts 12 which extend from a cross sectional angle shaped strip 13 arranged parallel with and having its horizontal portion engaging the longitudinal rear edge of the plate, and said eye bolts being disposed in a manner whereby the sections may be connected in parallel formation with one section directly ahead of the other and of course the rod 10 could serve for the purpose of securing a means for dragging the implement, such means being a tractor or the like (not shown).

Extending from one end edge of the plate 1 are a plurality of spaced hinge elements 14 and extending from the opposite end are companion hinge elements 15, a bolt rod 17 of the same structure as the rod 10 is adapted to secure the hinge elements in cooperative association whereby the sections may be fixed in end to end relation, a nut 18 being operatively associated with the bolt rod 17. Stud bolts 19 secure the hinge elements in operative association to the ends of the plate and fixed to the lower end of the stud bolts are cross sectional angle shaped strips 20 as shown in Figure 5 of the drawings and which are adapted to prevent the clods and the like from escaping the units 2 whereby it will be apparent that when the sections drag over the soil the clods will be thoroughly pulverized.

Each section is provided with a leveling strip 21 adjustably mounted and secured to the rear longitudinal edge of the plates and this mentioned strip when lowered as shown in Figures 7 and 8 of the drawings is adapted to level soil after the same has been pulverized by the respective units 2. The strip 21 is arranged in its lowermost position when the sections are used as rear sections in a group, or when used singly when only a small plot of land is to be conditioned.

Transversing the plate midway its ends is a reinforcing strip 22, the ends of which as well as the ends of the angle shaped strips 20 project beyond the front and rear edges of the plate 1 and to the front ends of the reinforcing strip 22 and angle shaped strips 20 is bolted the cross sectional angle shaped strip 7, while the cross sectional angle shaped strip 13 is bolted to the rear ends thereof as shown in Figures 6 and 7 of the drawings.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In an agricultural implement of the character described comprising an elongated plate provided with a plurality of openings formed therethrough, recesses arranged about each of said openings, substantially V-shaped pulverizing units fixed to the lower surface of said plate, bolts passing through the openings and being countersunk in bores formed in the units, studs rising from each unit and extending into the recesses to prevent rotation of said units.

2. A sectional agricultural implement of the character described comprising an elongated plate, pulverizing units depending therefrom and being fixed thereto to engage the lower surface thereof, cross sectional angle shaped strips arranged to engage the front and rear edge of said plate, means extending from each end of said plate and being also adapted for securing plates of like structure thereto, means including the extending means for receiving the cross sectional angle shaped strips, means carried by said cross sectional angle shaped strips whereby plates provided with similar pulverizing units may be secured to the plate first mentioned, and a leveling strip adjustably secured to the rear cross sectional angle shaped strip.

In testimony whereof I affix my signature.

THOMAS ERNEST FRANCIS.